M. B. DYOTT,

Assignor to GEO. H. LOMAX.

LAMP.

No. 7,458. Reissued Jan. 9, 1877.

Witnesses.

Geo Gray.

F. C. Hale.

Michael B. Dyott by his attorney.

F. P. Hale.

N. PETERS, PHOTO-LITHOGRAPHER, WASHINGTON, D. C.

UNITED STATES PATENT OFFICE.

MICHAEL B. DYOTT, OF PHILADELPHIA, PENNSYLVANIA, ASSIGNOR TO GEORGE H. LOMAX, OF SOMERVILLE, MASSACHUSETTS.

IMPROVEMENT IN LAMPS.

Specification forming part of Letters Patent No. 40,094, dated September 29, 1863; reissue No. 7,458, dated January 9, 1877; application filed July 21, 1876.

*To all whom it may concern:*

Be it known that I, MICHAEL B. DYOTT, of Philadelphia, in the county of Philadelphia and State of Pennsylvania, have invented an Improved Lamp; and I do hereby declare that the following is a full, clear, and exact description of the same, reference being had to the accompanying drawings, making a part of this specification, in which—

Figure 1:
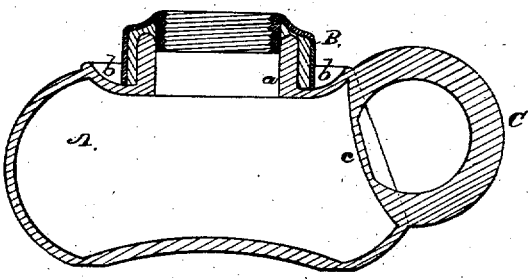
Figure 2:
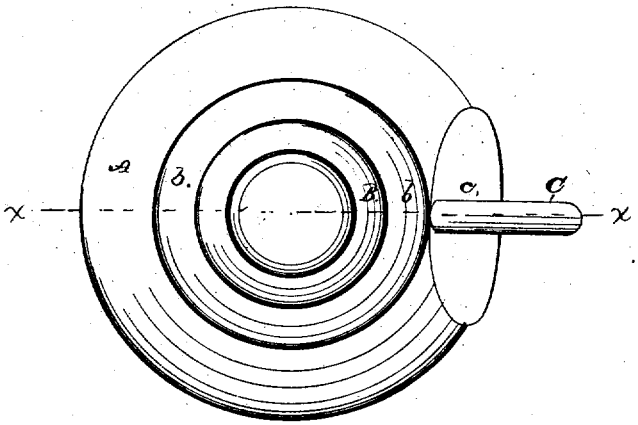

Figure 1 is a side sectional view of my invention, taken in the line *x x* of Fig. 2; Fig. 2, a plan or top view of the same.

Similar letters of reference indicate corresponding parts in the two figures.

This invention relates to that class of lamps designed for burning coal-oil. These lamps should be provided with burners placed as low as possible, so as to be in close proximity to the oil, in order to insure a good illuminating flame, and when the lamp is not burning, the oil, with a burner thus arranged, is liable to flow from the wick, which it ascends by capillary attraction, and runs down the side of the lamp. To obviate this latter objection, and to accomplish the result first named, I sink or depress the neck or top of the lamp, so as to form a drip-trough or gutter around the collar, into which the burner is screwed, the drip-trough receiving the oil which may be drawn up the wick or spilled from the lamp, the neck of the lamp, at the same time, by the formation of the drip-trough or gutter, being of sufficient length or height to admit of the collar being firmly attached to it, and be sufficiently low to bring the burner quite close to the oil.

Besides this feature the invention consists in constructing or forming the reservoir of the lamp, with an indentation or hollow, to partially receive the handle and still admit of the finger being readily passed through, the latter, in order to carry the lamp or move it from place to place. By this arrangement the handle will not be liable to be broken off or the lamp upset.

To enable those skilled in the art to fully understand and construct my invention, I will proceed to describe it.

A represents the reservoir or body of the lamp, which is of oblate spheroidal form, and is provided with a neck, *a*, at the center of its upper part. This neck *a* is formed with a depression or hollow, *b*, all around it, as shown clearly in Fig. 1, which causes the base of the neck to be below the top surface of the reservoir, and thereby admits of the neck being of sufficient height to receive and hold firmly a metal collar, B, into which the burner is screwed, as usual.

By this arrangement or mode of construction the burner of the lamp, it will be seen, is brought quite close to the oil, and, at the same time, a drip-trough is formed to catch the oil, which is drawn up by the wick and flows therefrom, so that no oil will run down the side of the lamp, and be deposited upon the article or support upon which the lamp is placed.

The reservoir A has a hollow or indentation, *c*, made in it at any point in its side, as shown in both figures, and in this hollow or indentation the annular handle C is secured or attached. This hollow or indentation causes the handle C to be much less prominent than it would otherwise be, and still admits of the finger being readily slipped through it when the lamp is to be lifted or carried from place to place. The handle, therefore, is not so liable to be broken off, nor the lamp upset, as when the handle projects the distance of its whole diameter from the prominent exterior surface of the reservoir. The reservoir A may be constructed either of glass or metal.

Having thus described my invention, what I claim, and desire to secure by Letters Patent, is—

1. A lamp oil reservoir or fountain provided with a neck for reception of a cover or screw-cap collar, as shown, and with a waste-oil-receiving channel or space encompassing such neck, all being substantially as set forth.

2. A lamp having a handle-depression, *c*, formed in its side, and a handle, C, affixed therein, substantially as shown and described.

3. A lamp having around its neck or filling-orifice a drip-trough or waste-oil-receiving channel or space, in one piece of material with the oil-reservoir and its neck, all being essentially as set forth.

4. A lamp reservoir or fountain having a neck, and provided with a waste-oil-receiving channel or space circumscribing such neck.

In testimony that I claim the foregoing as my own invention I affix my signature in presence of three witnesses.

MICHAEL B. DYOTT.

Witnesses:
B. F. MOORE,
GEO. H. LOMAX,
CHARLES H. RUSSELL.